(12) United States Patent
Swanson et al.

(10) Patent No.: US 9,658,930 B2
(45) Date of Patent: May 23, 2017

(54) METHOD AND DEVICE FOR MANAGING HARDWARE ERRORS IN A MULTI-CORE ENVIRONMENT

(75) Inventors: Robert Swanson, Olympia, WA (US); Mallik Bulusu, Olympia, WA (US); Robert B. Bahnsen, Tacoma, WA (US); Narayan Ranganathan, Portland, OR (US); David Lombard, Rossmoor, CA (US)

(73) Assignee: Intel Corporation, Santa Clara, CA (US)

( * ) Notice: Subject to any disclaimer, the term of this patent is extended or adjusted under 35 U.S.C. 154(b) by 629 days.

(21) Appl. No.: 13/976,030

(22) PCT Filed: Dec. 30, 2011

(86) PCT No.: PCT/US2011/068130
§ 371 (c)(1),
(2), (4) Date: Jun. 26, 2013

(87) PCT Pub. No.: WO2013/101193
PCT Pub. Date: Jul. 4, 2013

(65) Prior Publication Data
US 2014/0164827 A1    Jun. 12, 2014

(51) Int. Cl.
*G06F 11/00* (2006.01)
*G06F 11/20* (2006.01)

(52) U.S. Cl.
CPC ...... *G06F 11/2028* (2013.01); *G06F 11/2035* (2013.01); *G06F 11/2041* (2013.01); *G06F 11/2043* (2013.01); *G06F 11/2025* (2013.01)

(58) Field of Classification Search
CPC .. G06F 11/0727; G06F 11/076; G06F 11/201; H06L 67/1097

USPC ....... 714/15, 48, 3, 4.1, 4.11, 47.2; 709/203, 709/219, 223; 370/242
See application file for complete search history.

(56) References Cited

U.S. PATENT DOCUMENTS

| 7,337,334 B2 * | 2/2008 | Kuhlmann | G06F 1/3203 713/300 |
| 7,797,512 B1 * | 9/2010 | Cheng | G06F 9/455 712/10 |
| 8,074,110 B2 | 12/2011 | Vera et al. | |

(Continued)

FOREIGN PATENT DOCUMENTS

WO      2013101193 A1    7/2013

OTHER PUBLICATIONS

International Search Report and Written Opinion received for International Application No. PCT/US2011/068130, mailed on Sep. 26, 2012, 9 pages.

(Continued)

*Primary Examiner* — Bryce Bonzo
*Assistant Examiner* — Jeison C Arcos
(74) *Attorney, Agent, or Firm* — Barnes & Thornburg LLP

(57) ABSTRACT

A method and device for managing hardware errors in a multi-core environment includes allocating processor cores to a main set and a spare set of processor cores. The main set of processor cores are used by an operating system, and the spare set of processor cores are dedicated to software applications. Should a processor core error occur, a processor core swap may be performed to swap a spare processor core for a failing main processor core without interrupting the execution of the operating system.

23 Claims, 5 Drawing Sheets

(56) References Cited

U.S. PATENT DOCUMENTS

| | | | |
|---|---|---|---|
| 2002/0049892 A1* | 4/2002 | Saulsbury | G06F 9/30101 712/1 |
| 2003/0051190 A1* | 3/2003 | Marisetty | G06F 11/2242 714/11 |
| 2005/0015661 A1 | 1/2005 | Vaidyanathan | |
| 2005/0050373 A1* | 3/2005 | Orenstien | G06F 1/206 713/320 |
| 2005/0154851 A1* | 7/2005 | Charles | G06F 12/023 711/170 |
| 2006/0212677 A1 | 9/2006 | Fossum | |
| 2007/0074011 A1* | 3/2007 | Borkar | G06F 1/3203 712/227 |
| 2007/0282572 A1* | 12/2007 | Larus | G06F 9/5066 703/2 |
| 2007/0294689 A1* | 12/2007 | Garney | G06F 9/5077 718/1 |
| 2008/0005539 A1* | 1/2008 | Velhal | G06F 11/008 712/220 |
| 2008/0163239 A1* | 7/2008 | Sugumar | G06F 9/5088 718/105 |
| 2008/0163255 A1 | 7/2008 | Munoz et al. | |
| 2008/0235454 A1 | 9/2008 | Duron et al. | |
| 2008/0244354 A1* | 10/2008 | Wu | G06F 11/1407 714/755 |
| 2009/0094481 A1* | 4/2009 | Vera | G06F 1/206 714/11 |
| 2009/0172228 A1* | 7/2009 | Zimmer | G06F 9/4405 710/260 |
| 2009/0172690 A1* | 7/2009 | Zimmer | G06F 9/5077 718/104 |
| 2009/0313489 A1* | 12/2009 | Gunther | G06F 1/3203 713/300 |
| 2010/0153700 A1* | 6/2010 | Capps, Jr. | G06F 9/3842 713/100 |
| 2010/0192029 A1* | 7/2010 | Wang | G06F 11/2284 714/723 |
| 2011/0010709 A1* | 1/2011 | Anand | G06F 9/5077 718/1 |
| 2011/0087943 A1* | 4/2011 | Mangione-Smith | G06F 13/4022 714/748 |
| 2011/0161630 A1* | 6/2011 | Raasch | G06F 9/30196 712/205 |
| 2014/0164827 A1* | 6/2014 | Swanson | G06F 11/2035 714/10 |
| 2014/0380019 A1* | 12/2014 | Wilkerson | G06F 9/50 712/30 |

OTHER PUBLICATIONS

"Uncore," Wikipedia, The Free Encyclopedia, available: <http://en.wikipedia.org/w/index.php?title=Uncore&oldid=456341135>, accessed Dec. 28, 2011, 1 page.

"Message Passing Interface," Wikipedia, The Free Encyclopedia, available: <http://en.wikipedia.org/w/index.php?title=Message_Passing_Interface&oldid=468036762>, accessed Dec. 28, 2011, 14 pages.

Extended European Search Report issued in connection with European Patent Application No. 11878683.9-1954, dated Nov. 12, 2015, 16 pages.

Chinese Office Action and English Translation for Application No. 201180076125.7, dated Jan. 10, 2017, 24 pages.

\* cited by examiner

METHOD AND DEVICE FOR MANAGING HARDWARE ERRORS IN A MULTI-CORE ENVIRONMENT

BACKGROUND

Contemporary high-performance computing relies on the use of many processor cores to perform various intensive and complicated computations and processes. Some computing devices are specifically designed for such tasks and may include multiple processor sockets with each processor having multiple processor cores. As such, high-performance computing system may utilize fifty or more processor cores or threads to perform various workloads. Such systems may include "small cores," a combination of "small" and "big" cores", or all "big" cores. Small cores may be defined as lower feature processor cores designed for highly parallel computing, whereas big cores are defined as general purpose computer cores such as those typically found in standard server computing devices.

In a multi- or many-core system, the failure of a single processor core may result in an unrecoverable error of the entire system, including any remaining good cores. The potential of critical failure of the entire system is magnified with a larger number of processor cores. For example, in a system with fifty processor cores, the failure of one of the fifty processor cores can cause the failure of the entire system. Additionally, the failure of one processor core in one location of the processor die may place undue stress on adjoining cores and tiles. Further, the loss of processor cores can increase the workload of remaining cores, which may exacerbate any current problems in the processor core or tile. Some systems include software solutions to manage the processor core errors. However, such software solutions typically increase the workload overhead of the system and fail to consider core or tile layout and its effect on the health and throughput of continued computing on the system.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
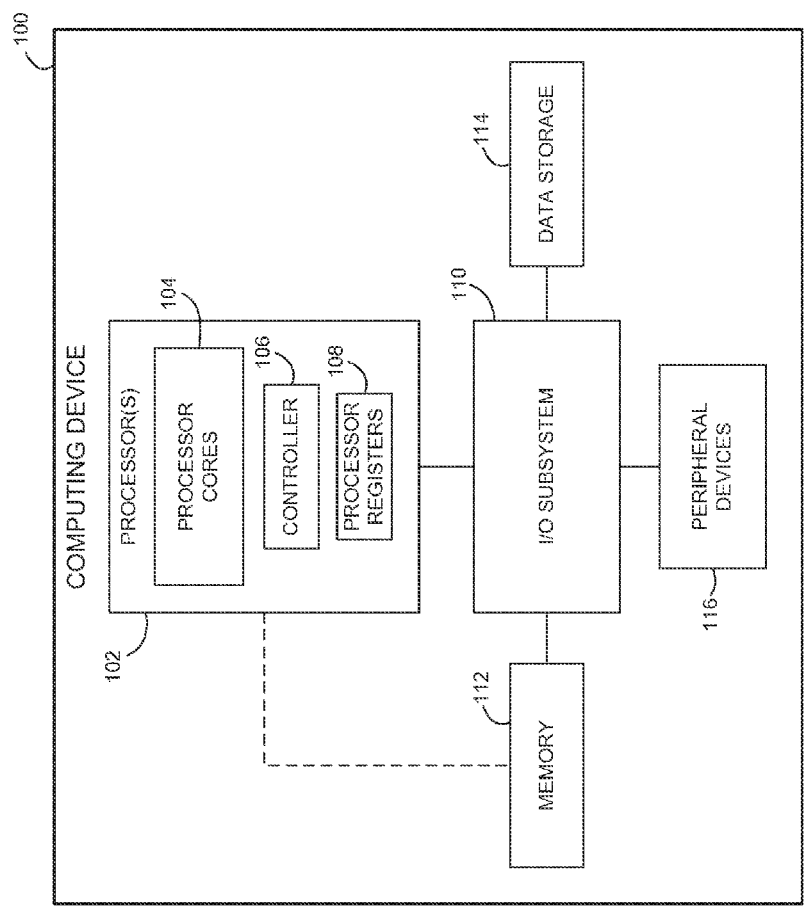
FIG. 1 is a simplified block diagram of at least one embodiment of a computing device for managing hardware errors in a multi-core environment.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions carried by or stored on a transitory or non-transitory machine-readable medium, which may be read and executed by one or more processors. A machine-readable medium may be embodied as any device, mechanism, or physical structure for storing or transmitting information in a form readable by a machine (e.g., a computing device). For example, a machine-readable medium may be embodied as read only memory (ROM); random access memory (RAM); magnetic disk storage media; optical storage media; flash memory devices; mini- or micro-SD cards, memory sticks, electrical signals, and others.

In the drawings, specific arrangements or orderings of schematic elements, such as those representing devices, modules, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between of among two or more other schematic elements, the absence of any such connecting elements is not meant to imply that no connection, relationship or association can exist. In other words, some connections, relationships or associations between elements may not be shown in the drawings so as not to obscure the disclosure. In addition, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, a computing device 100 for managing hardware errors in a multi-core environment includes one or more multi-core processors 102. Each of the multi-core processors 102 includes one or more processor cores 104 such that the computing device 100 includes two or more processor cores. For example, in some embodiments, the computing device 100 may include fifty or more processor cores. In use, hardware errors of the computing device 100 that originate from the processor cores 104 are managed by allocating the processor cores 104 between a main set 202 and a spare set 204 of processor cores (see FIG. 2). To do so, as discussed in more detail below, a main hardware description table 212 (see FIG. 2) that identifies each of the processor cores 104 of the main set 202 and a separate spare hardware description table 214 (see FIG. 2) that identifies each of the processor cores 104 of the spare set 204 are established.

The processor cores 104 of the main hardware description table 212 are exposed to an operating system executed on the computing device 100 while the processor cores 104 of the spare hardware description table 214 are "abstracted" or not otherwise directly accessible to the operating system kernel. The processor cores 104 of the spare hardware description table 214 are reserved for and assigned to software applications (e.g., computational intensive applications) executed on the computing device 100 in a computational request response fashion. To do so, a message passing interface (MPI) is established between the software applications and the assigned processor cores 104 of the spare set 204. Should a processor core error occur with one of the assigned processor cores 104, the associated interrupt is limited to the spare set 204 of processor cores 104 (i.e., the interrupt is not received by the main set 202 of processor cores 104). As such, the associated software application (or task of the associated software application) may be restarted and a new processor core(s) 104 of the spare set 204 may be assigned to the software application (or task thereof). Alternatively, should a processor core error occur with one of the processor cores 104 of the main hardware description table 212, a processor core swap may be performed to replace the failing/failed processor core 104 of the main set 202 with a processor core 104 from the spare set 204. In one embodiment, the processor core swap is performed based upon the location of the failing/failed processor core(s) 104 in the processor die to minimize future errors and to minimize latency (e.g., the replacement processor core(s) 104 of the spare set 204 may be selected based on the die location of the failing/failed processor core(s) 104 of the main set 202). Additionally, the processor core swap is performed without affecting the operating system, which is executing on the processor cores 104 of the main set 202, by using embedded firmware, hardware, system software, etc. To do so, as discussed below, the context of the computing device 100 is paused as performed in a typical System Management Mode (SMM) or similar error handling state. In this way, the execution of the operating system may be uninterrupted (e.g., the operating system need not be restarted) even in the event of a processor core failure.

As shown in FIG. 1, the processor(s) 102 includes a controller 106 and processor registers 108, which may be embodied as memory locations of internal memory of the processor(s) 102. The controller 106 may be embodied as control circuitry and associated firmware/microcode for controlling the operation of and access to the processor cores 104. For example, as discussed in more detail below, the controller 106 configures the processor registers 108 for the allocation of processor cores to the spare set 204 and manages access to the main set 202 and spare set 204 of the processor cores 104. Additionally, as discussed in more detail below, the processor registers 108 includes register flags, bits, or other indicators for each processor core 104 to indicate whether the respective processor core 104 has failed (or is failing) and to control or limit the broadcast of hardware interrupts caused by the respective processor core 104 to the respective processor sets 202, 204.

The computing device 100 may be embodied as any type of computing device such as a mobile computing device, a smart phone, a computing tablet, a mobile internet device, a lap top computer, a digital assistant, a desktop computer, a server, and/or other computing device capable of performing the functions described herein. As shown in FIG. 1, the illustrative computing device 100 further includes an I/O subsystem 110, a memory 112, a-data storage 114, and one or more additional peripheral devices 116. In some embodiments, several of the foregoing components may be incorporated on a motherboard of the computing device 100, while other components may be communicatively coupled to the motherboard via, for example, a peripheral port. Furthermore, it should be appreciated that the computing device 100 may include other components, sub-components, and devices commonly found in a multi-core computing device or system, which are not illustrated in FIG. 1 for clarity of the description.

The I/O subsystem 110 of the computing device 100 may be embodied as circuitry and/or components to facilitate input/output operations with the processor(s) 102 and/or other components of the computing device 100. In some embodiments, the I/O subsystem 110 may be embodied as a memory controller hub (MCH or "northbridge"), an input/output controller hub (ICH or "southbridge"), and a firmware device. In such embodiments, the firmware device of the I/O subsystem 110 may be embodied as a memory device for storing Basic Input/Output System (BIOS) data and/or instructions and/or other information (e.g., a BIOS driver used during booting of the computing device 100). However, in other embodiments, I/O subsystems having other configurations may be used. For example, in some embodiments, the I/O subsystem 110 may be embodied as a platform controller hub (PCH). In such embodiments, the memory controller hub (MCH) may be incorporated in or otherwise associated with the processor(s) 102, and the processor(s) 102 may communicate directly with the memory 112 (as shown by the hashed line in FIG. 1). Additionally, in other embodiments, the I/O subsystem 110 may form a portion of a system-on-a-chip (SoC) and be incorporated, along with the processor(s) 102 and other components of the computing device 100, on a single integrated circuit chip.

The processor(s) 102 is communicatively coupled to the I/O subsystem 110 via a number of signal paths. These signal paths (and other signal paths illustrated in FIG. 1) may be embodied as any type of signal paths capable of facilitating communication between the components of the computing device 100. For example, the signal paths may be embodied as any number of point-to-point links, wires, cables, light guides, printed circuit board, traces, via, bus, intervening devices, and/or the like.

The memory 112 of the computing device 100 may be embodied as or otherwise include one of more memory devices or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices. The memory 112 is communicatively coupled to the I/O subsystem 110 via a number of signal paths. Although only a single memory device 112 is illustrated in FIG. 1, the computing device 100 may include additional memory devices in other embodiments. Various data and software may be stored in the memory 112. For example, one or more operating systems, applications, programs, libraries, and drivers that make up the software stack executed by the processors(s) 102 may reside in memory 112 during execution.

The data storage 114 may be embodied as any type of device or devices configured for the short-term or long-term storage of data such as, for example, memory devices and circuits, memory cards, hard disk drives, solid-state drives, or other data storage devices. For example, an operating system and various software applications to be executed on the computing device 100 may be stored, in the data storage 114. Additionally, data generated by such software applications may be stored on the data storage 114 for later retrieval and use as need by the software application.

The peripheral devices 116 of the computing device 100 may include any number of additional input/output devices, interface devices, and/or other peripheral devices. For example, the peripheral devices 116 may include a display, keyboard, mouse, speakers, and/or other peripheral devices. The peripheral devices 116 are communicatively coupled to the I/O subsystem 110 via a number of signal paths thereby allowing the I/O subsystem 110 and/or processor(s) 102 to receive inputs from and send outputs to the peripheral devices 116.

Figure 2:
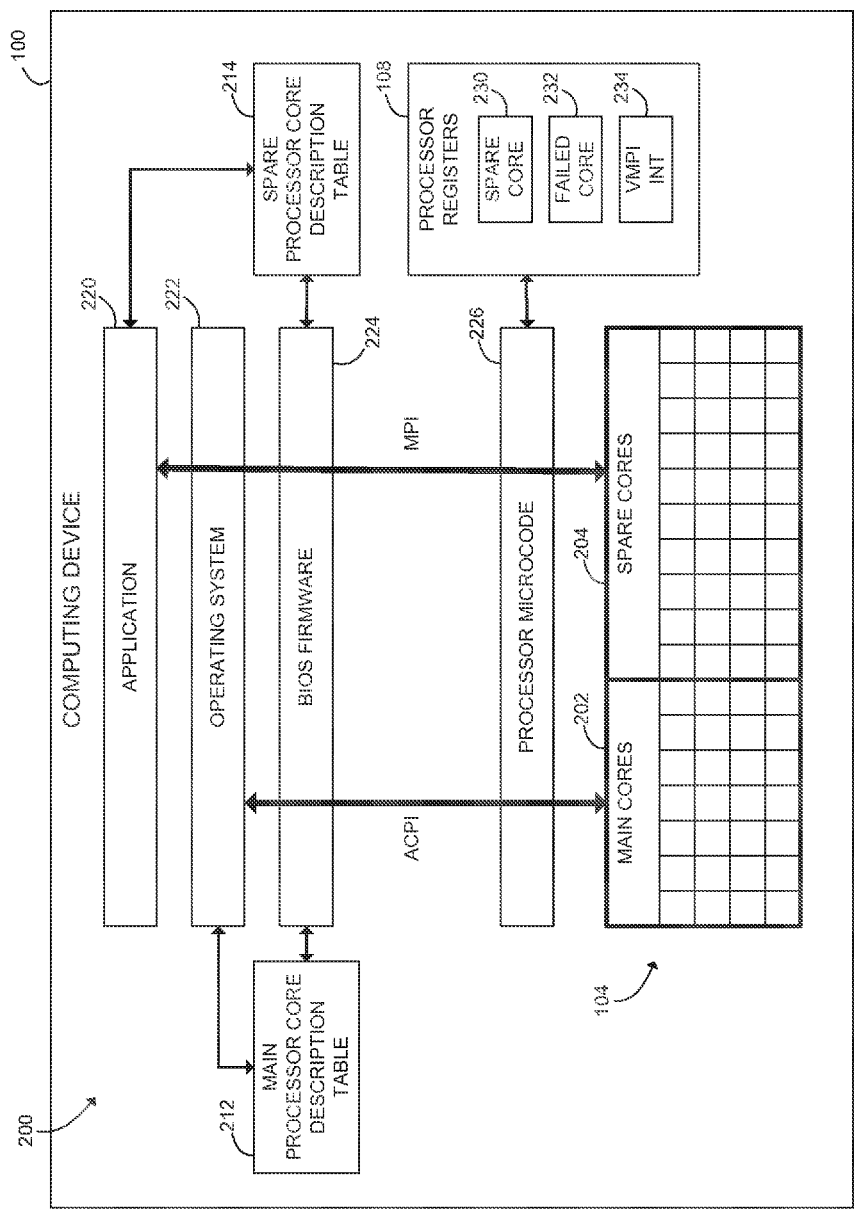
FIG. 2 is a simplified block diagram of at least, one embodiment of a software environment of the computing device of FIG. 1.

Referring now to FIG. 2, in use, the computing device 100 establishes a software environment 200. The software environment 200 includes one or more software applications 220, which are executed on an operating system 222 of the computing device 100. The software application 220 may be embodied as any type of software application capable of utilizing the processor cores 104 of the spare set 204 as discussed below. For example, in one embodiment, the software application 200 is embodied as a computational intensive, multi-threaded application.

The software environment 200 also includes a firmware 224, such as a basic input/output system (BIOS) firmware, which controls access to the processor cores 104 by the applications 220 and the operating system 222. To do so, as discussed above, the firmware 224 establishes the main processor core description table 212, which is illustratively embodied as a Multiple Advance Programmable Interrupt Controller (APIC) Description Table (MADT). Of course, other types of hardware description tables, lists, or datasets may be used in other embodiments. The main processor core description table 212 identifies each of the unallocated processor cores 104 of the main set 202. However, the allocated processor cores 104 of the spare set 204 are not listed in the main processor core description table 212. During initialization, the operating system 222 accesses the main processor core description 212 to identify those processor cores 104 available to the operating system 222. Because the allocated processor cores 104 of the spare set 204 are not listed in the main processor core description table 212, the allocated processor cores 104 of the spare set 204 are "abstracted" from the operating system 222 and, as such, the operating system 222 does not directly use the processor cores 104 of the spare set 204 during normal operation.

The firmware 224 also establishes the spare processor core description table 214, which is illustratively embodied as a virtual message passing interface (VMPI) table. Again, other types of hardware description tables, lists, or datasets may be used in other embodiments. The spare processor core description table 214 identifies each of the allocated processor cores 104 of the spare set 204 of processor cores 104. During execution of the application 220, processor cores 104 of the spare processor core description table 214 are assigned to the software application 220 (or individual task/thread of the software application 220) as needed.

To facilitate interaction with the processor cores 104, the firmware 224 also establishes an Advanced Configuration and Power Interface (ACPI) between the operating system 222 and the processor cores 104 of the main set 202 and a Message Passing Interface (MPI) between the application 220 and the processor cores 104 of the spare set 204. The operating system 222 uses the ACPI to communicate with the processor cores 104 of the main set 202 and the application 220 uses the MPI to communicate with the processor cores of the spare set 204.

The software environment 200 also includes one or more processor microcode 226, which may be executed by the controller 106 of the processor(s) 102. The microcode 226 manages and controls access to the processor cores 104. For example, as discussed above, the microcode 226 maintains processor registers 108 to facilitate the allocation of processor cores 104 between the main set 202 and the spare set 204. Although shown and described in the illustrative embodiment of FIG. 2 as processor microcode 226, it should be appreciated that in other embodiments a BIOS SMM or other embedded operational code may be used to manage and control the access to the processor cores 104.

In the illustrative embodiment of FIG. 2, the processor registers 108 include a number of flags, bits, or other indicators usable to indicate a status of the processor cores 104 and control the handling of errors generated therefrom.

For example, the processor registers 108 include a spare core flag 230 that may be used (e.g., "set") by the microcode 226 to indicate that the respective processor core 104 has been allocated to the spare set 204. The processor registers 108 also includes a failed core flag 232 that may be used by the microcode 226 to indicate that the respective processor core 104 has failed or is failing. Additionally, the processor registers 108 include a Virtual Message. Passing Interface (VMPI) interrupt flag 234 that may be used by the microcode 226 to indicate that any interrupt caused by the respective processor core 104 should be broadcast to, or otherwise accessible by, only the processor cores 104 of the spare set 204.

As discussed in more detail below, should a processor core error occur during operation of the computing device 100, the firmware 224 and/or microcode 226 may perform certain actions to facilitate the recovery of the computing device 100 from the hardware error. For example, if the processor core error is caused by a processor core 104 of the spare set 204, the hardware error generated therefrom is broadcast only to those processor cores 104 of the spare set 204 and, as such, is recoverable. To do so, the firmware 224 instructs the application 220 to restart, which causes new processor cores 104 of the spare set 204 to be assigned to the application 220. Alternatively, if the processor core error is caused by a processor core 104 of the main set 202, the firmware 224/microcode 226 may perform a processor core swap (if the error is recoverable) to replace the failed/failing processor core 104 of the main set 202 with a processor core 104 of the spare set 204. In this way, processor core errors may be handled without halting or restarting execution of the operating system 222.

Figure 3:
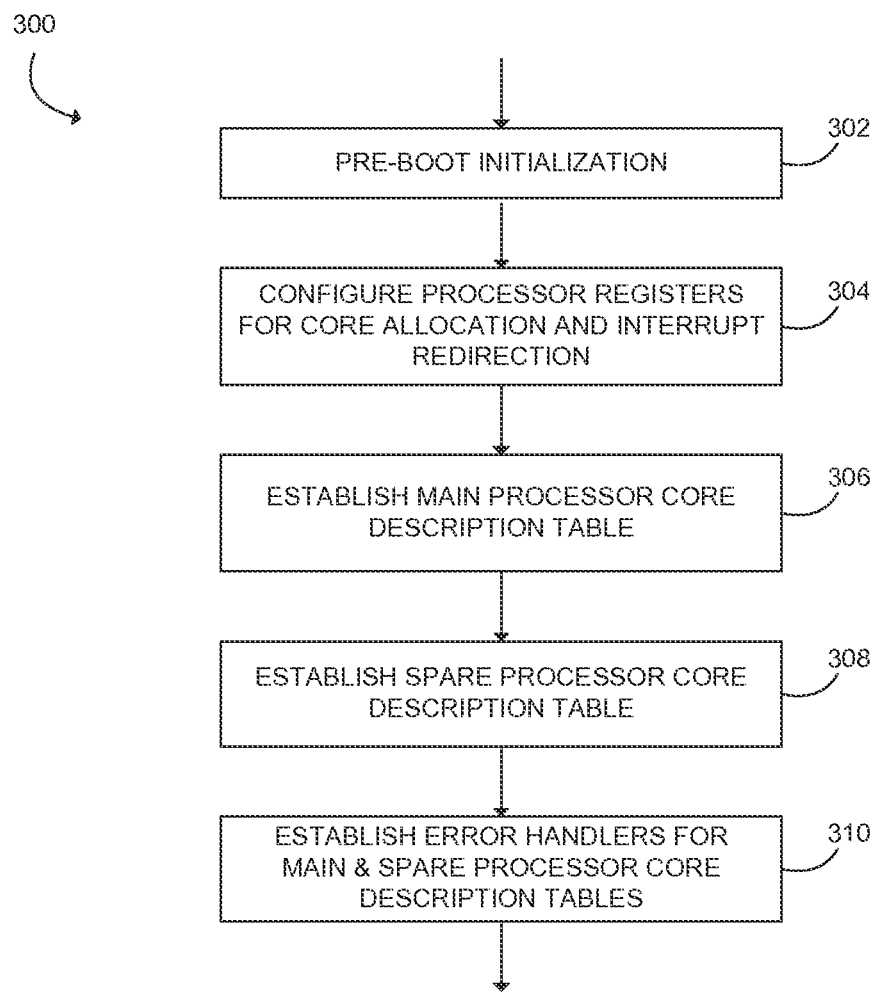
FIG. 3 is a simplified flow diagram of at least one embodiment of a method for allocating processor cores of the computing device of FIG. 1.

Referring now to FIG. 3, in use, the computing device 100 may execute a method 300 to allocate processor cores 104 to the main set 202 and the spare set 204. The method 300 begins with block 302 in which the computing device 100 performs pre-boot initialization procedures (e.g., the memory 112 may be initialized). In block 304, the microcode 226 configures the processor registers 108 for allocation of the processor cores 104. To do so, as discussed above, the firmware 224 or microcode 226 may configure the processor registers 108 for use with the spare core flag 230, the failed core flag 232, and the VMPI interrupt flag 234. The microcode 226 may also set the spare, core flag 230 and VMPI interrupt flag 234 for those processor cores 104 allocated to the spare set 204.

In block 306, the firmware 224 establishes the main processor core description table 212. As discussed above, the main processor core description table 212 identifies each of the unallocated processor cores 104 of the main set 202. Similarly, in block 308, the firmware 224 establishes the spare processor core description table 214. Again, as discussed above, the spare processor core description table 214 identifies each of the allocated processor cores 104 of the spare set 204 the main set 202 of processor cores 104. Additionally, in block 310, the firmware 224 establishes the error handlers for the processor cores 104 of the main processor core description table 212 and the spare processor core description table 214 (e.g., see method 500 of FIG. 5).

Figure 4:
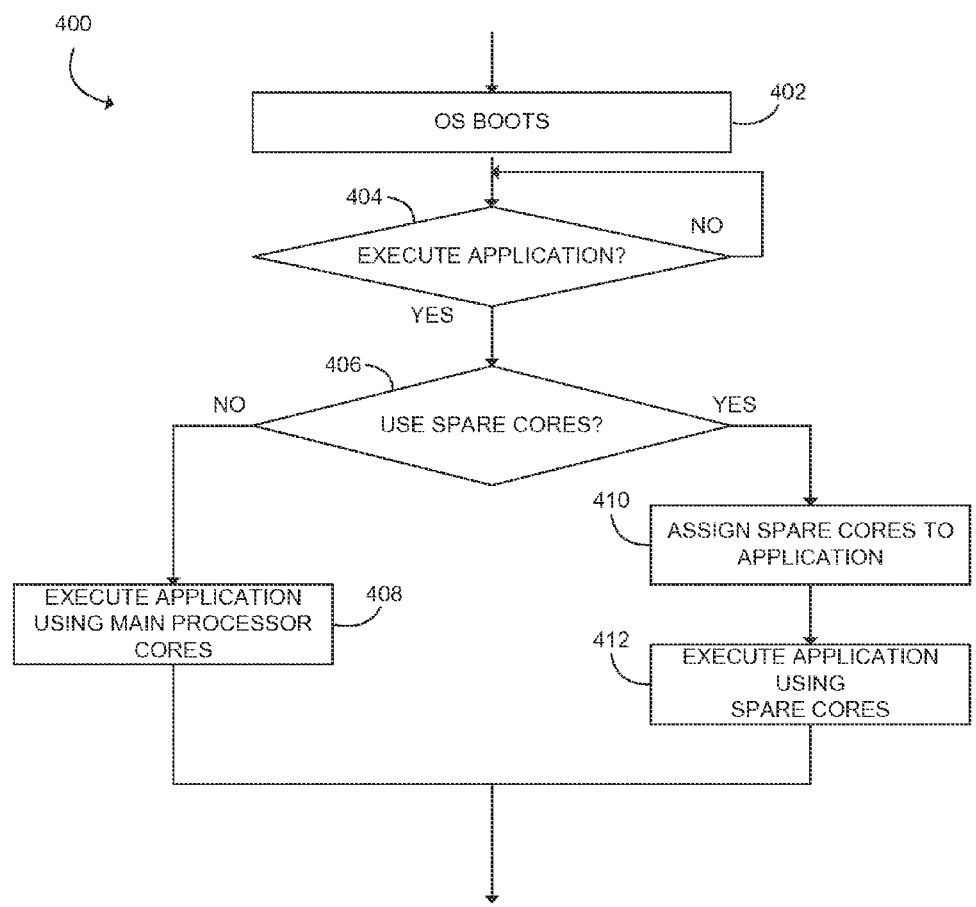
FIG. 4 is a simplified flow diagram of at least one embodiment of a method for executing an application on the computing device of FIG. 1.

Referring now to FIG. 4, after the computing device 100 has performed the initialization and processor core allocation procedure of method 300, the computing device 100 may load the operating system 222 and execute one or more software applications 220. To do so, the computing device 100 may execute a method 400 for executing a software application on the computing device 100. The method 400 begins with block 402 in which the operating system 122 is loaded onto the computing device 100. In block 404, the computing device 100 determines whether to execute a software application 220. If so, the method 400 advances to block 406 in which the computing device 100 determines whether the software application 220 is to use the allocated processor cores 104 of the spare set 204. If not, the software application 220 is executed using the processor cores 104 from the main set 202 in block 408. However, if the software application 220 is to use the allocated processor cores 104 of the spare set 204, the method 400 advances to block 410 in which one or more processor cores of the spare set 204 is assigned to the software application 220. The computing device 100 may use any suitable methodology or algorithm (e.g., load balancing algorithms) to select the processor cores 104 of the spare set 204 to be assigned to the software application 220. Subsequently, in block 412, the software application is executed using the assigned processor cores 104 of the spare set 204. It should be appreciated that, in some embodiments, every software application 220 executed on the computing device 100 is assigned processor cores 104 from the spare set 204.

Figure 5:
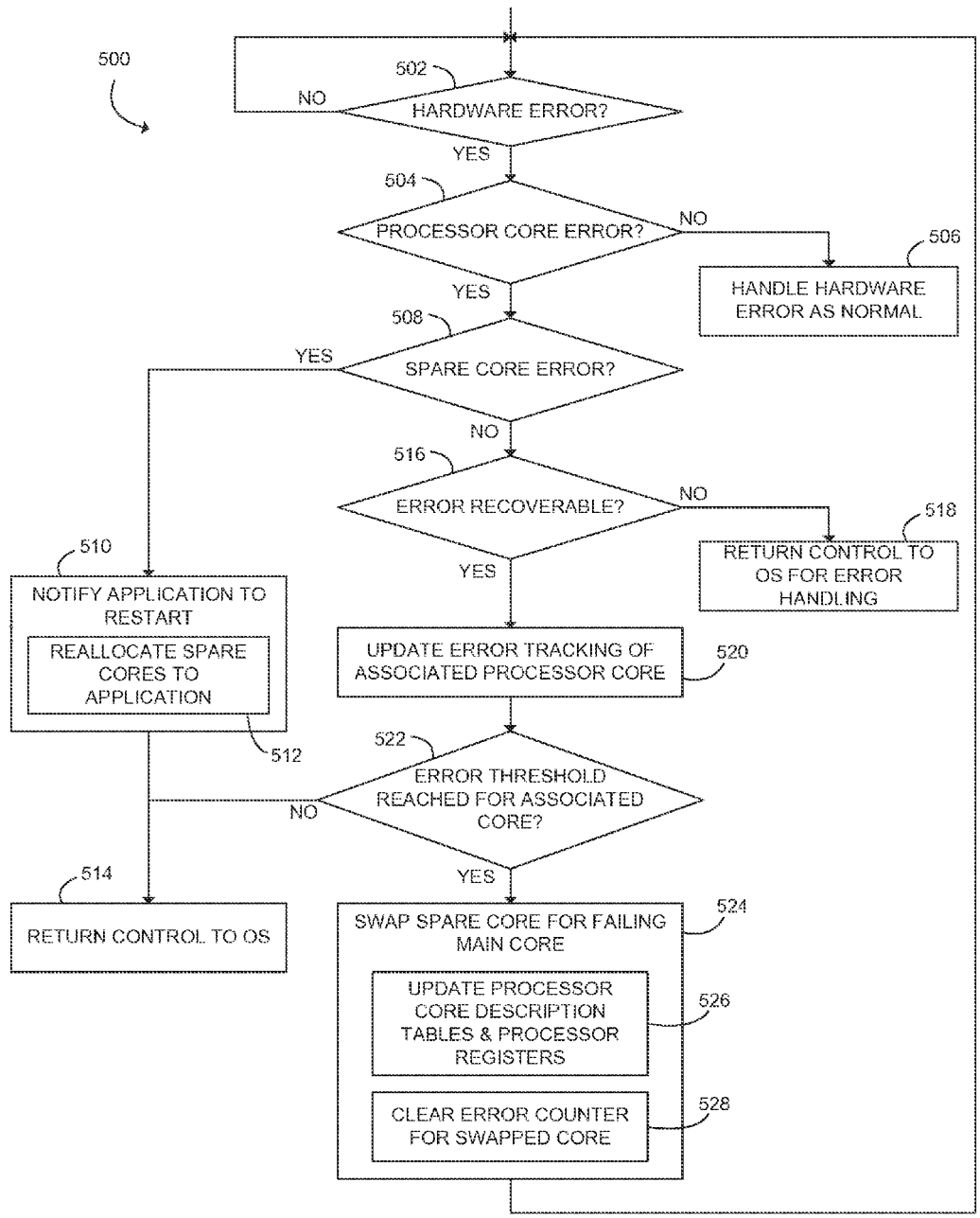
FIG. 5 is a simplified flow diagram of at least one embodiment of a method for managing hardware errors of the computing device of FIG. 1.

Referring now to FIG. 5, during execution of the software application 220, one or more hardware errors may occur. As such, the computing device 100 may execute a method 500 for managing hardware errors. The method 500 begins with block 502 in which the computing device 100 determines whether a hardware error has occurred. In some embodiments, a system management interrupt (SMI) is generated in response to the hardware error. If a hardware error has not occurred, the method 500 loops back to block 502 to continue monitoring for hardware errors. However, if a hardware error has occurred, the method 500 advances to block 504 in which the computing device 100 determines whether the hardware error is a processor core error. If the computing device 100 determines that the hardware error is not a processor core error (e.g., the hardware error may be memory error), the method 500 advances to block 506 in which the hardware error is handled as normal.

However, if the hardware error is determined to be a processor core error, the method 500 advances to block 508 in which the firmware 224 of the computing device 100 determines whether the processor core error is caused by a processor core 104 of the spare set 204. If so, processor core error is recoverable, and the method 500 advances to block 510 in which the firmware 224 notifies the software application 220 to restart, and the firmware returns control the operating system 222 in block 514. As discussed above, when the application 220 is restarted, one or more new processor cores 104 of the spare set 204 will be assigned to the application 220 (i.e., the application is unlikely to be executed on the same processor cores 104 of the spare set 204). Additionally, as discussed above, if the processor core error is caused by a processor core 104 of the spare set 204, the system management interrupt (SMI) generated as a result of the processor core error is broadcast, only to those processor cores 104 of the spare set, and not to the processor cores 104 of the main set 202.

Referring back to block 508, if the firmware 224 determines that the processor core error is caused by a processor core 104 of the main set 202, the method 500 advances to block 516 in which the firmware 224 determines whether the processor core error is a recoverable error. If not, the method 500 advances to block 518 in which control is returned to the operating system 222 for additional error handling (if available). However, if the firmware 224 determines that the processor core error is a recoverable error in block 516, the method 500 advances to block 520 in which the firmware 224 updates an error tracking counter associated with the processor core 104 responsible for the processor core error. The error tracking counter may be embodied as any type of software counter or register for tracking the number of occurrences of processor core errors by the respective processor core 104. In block 522, the firmware 224 determines whether the error tracking counter for the associated processing core 104 has reached a reference threshold value (e.g., has the respective processor core 104 generated a number of processor core errors equal to or greater than the reference threshold value). If not, the method 500 advances to block 514 in which the firmware 224 returns control, the operating system 222 to allow the operating system 222 to reattempt execution of the last executed instruction or procedure.

However, if the error threshold of the respective processor core 104 has been reached, the method 500 advances to block 524 in which the firmware 224/microcode 226 performs a processor core swap. That is, the failed or failing processor core 104 (i.e., the processor core 104 that caused the processor core error) is replaced with a processor core 104 from the spare set 204. To do so, the firmware 224 updates the main processor core description table 212 to add the replacement processor core 104 from the spare set 204 in block 526. Additionally, the firmware 224 updates the spare processor core description table 214 to remove the replacement processor core 104. The firmware 224 may use any suitable methodology or algorithm to select which processor core(s) of the spare set 204 to use as replacement core(s). For example, in one embodiment, the firmware 224 selects the processor core(s) of the spare set 204 to use as replacement core(s) based on the die location of the failed or failing processor core 104 of the main set 202.

The microcode 226 also updates the processor registers 108 by resetting the spare core flag 230 to denote that the replacement processor core 104 is no longer allocated to the spare set 204 in block 526. Additionally, the microcode 226 may set the failed core flag 232 of the failed/failing processor core 104. Further, the firmware 224 and/or microcode 226 attempt to migrate the state information and context of the failing processor core 104 (e.g., register settings, etc.) to the replacement processor core 104 in block 524. However, in some cases, the complete context of the failing processor core 104 may not be accessible. In block 528, the firmware 224 clears the error counter associated with the replacement processor core 104 and the method 500 loops back to block 502 to monitor for additional hardware errors.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

The invention claimed is:

1. A computing device comprising:
a plurality of processor cores;
a memory;
firmware logic to (i) allocate at least one of the plurality of processor cores to a spare set of processor cores, (ii) establish a spare processor core hardware description table in the memory that includes each of the allocated processor cores, (iii) establish a main processor core hardware description table in the memory that includes each of the unallocated processor cores, (iv) determine whether a processor core error was caused by an allocated processor core, (v) instruct a software application executed on the computing device using the spare set of processor cores to restart in response to a determination that the processor core error was caused by the allocated processor core, and (vi) assign a new processor core of the spare set of processor cores to the software application in response to the software application being restarted; and
processor control logic to control a processor register to indicate whether each processor core of the plurality of processor cores is an allocated or unallocated processor core.

2. The computing device of claim 1, wherein the processor register includes a register flag usable to denote whether the associated processor core has failed.

3. The computing device of claim 1, wherein the processor register includes an interrupt register flag useable to cause any hardware interrupt originated from the associated processor core to be broadcast only to other processor cores of the spare set of processor cores and not to any unallocated processor core.

4. The computing device of claim 1, wherein the processor control logic to broadcast a system management interrupt, generated in response to the processor core error, only to the allocated processor cores of the spare set of processor cores in response to another processor core error being caused by an allocated processor core of the spare set of processor cores.

5. The computing device of claim 1, wherein the firmware logic to:
determine whether the processor core error was caused by an unallocated processor core,
determine whether the processor core error is recoverable in response to a determination that the processor core error was caused by an unallocated processor core,
increment an error counter associated with the unallocated processor core that caused the processor core error,
compare the error counter to a reference threshold, and
return control to an operating system executed on the computing device, in response to the error counter being less than the reference threshold, to allow the operating system to reattempt execution of the last software instruction prior to the generation of the processor core error.

6. The computing device of claim 1, wherein the firmware logic to:
determine whether the processor core error was caused by an unallocated processor core,
determine whether the processor core error is recoverable in response to a determination that the processor core error was caused by an unallocated processor core,
increment an error counter associated with the unallocated processor core that caused the processor core error,
compare the error counter to a reference threshold, and
perform a processor core swap between the unallocated processor cores and the allocated processor cores in response to the error counter equaling the reference threshold.

7. The computing device of claim 1, wherein the firmware logic is to:
determine whether the processor core error was caused by an unallocated processor core, and
replace the unallocated processor core that caused the processor core error with a replacement processor core from the spare set of processor cores without interrupting the execution of an operating system on the computing device in response to a determination that the processor core error was caused by the unallocated processor core.

8. The computing device of claim 7, wherein to replace the unallocated processor core that caused the processor core error with a replacement processor core comprises to set a virtual core identification number associated with the replacement processor core to a virtual core identification number associated with the unallocated processor core that caused the processor core error.

9. The computing device of claim 7, wherein to replace the unallocated processor core that caused the processor core error with a replacement processor core comprises to update a processor core register to indicate that the unallocated processor core that caused the processor core error has failed and that the replacement processor core is no longer allocated to the spare set of processor cores.

10. The computing device of claim 7, wherein to replace the unallocated processor core that caused the processor core error with a replacement processor core comprises to update the main hardware description table to (i) remove the unallocated processor core that caused the processor core error and (ii) add the replacement processor core.

11. One or more non-transitory machine readable media comprising a plurality of instructions that, in response to being executed, cause a computing device to:
allocate at least one processor core of a plurality of processor cores of a computing device to a spare set of processor cores;
execute an operating system on the computing device using only unallocated processor cores of the plurality of processor cores;
execute a software application on the computing device using the spare set of processor cores;
detect a processor core error caused by a processor core of the plurality of processor cores;
determine whether a processor core error was caused by an allocated processor core;
instruct the software application to restart in response to a determination that the processor core error was caused by the allocated processor core; and
assign a new processor core of the spare set of processor cores to the software application in response to the software application being restarted.

12. The one or more non-transitory machine readable media of claim 11, wherein to allocate at least one processor core comprises to establish a register flag for each processor core of the plurality of processor cores usable to denote whether the associated processor core has been allocated to the spare set of processor cores.

13. The one or more non-transitory machine readable media of claim 11, wherein the plurality of instructions further cause the computing device to:
establish a main processor core description table for the unallocated cores and establish a spare processor core description table for the spare set of processor cores, the main processor core description table including only the unallocated cores,
wherein to execute the operating system comprises to expose the operating system only to the processor cores listed in the main processor core description table, and
wherein to execute the software application comprises to establish a message passing interface between the software application and at least one of the processor cores listed in the spare processor core description table.

14. The one or more non-transitory machine readable media of claim 11, wherein the plurality of instructions further cause the computing device to:
generate a system management interrupt in response a determination that the processor core error was caused by the allocated processor core; and
broadcast the system management interrupt only to the allocated processor cores of the spare set of processor cores.

15. The one or more non-transitory machine readable media of claim 11, wherein the plurality of instructions further cause the computing device to:
determine whether processor core error was caused by an unallocated processor core;
determine whether the processor core error is recoverable in response to a determination that the processor core error was caused by an unallocated processor core; and
increment an error counter associated with the unallocated processor core that caused the processor core error.

16. The one or more non-transitory machine readable media of claim 11, wherein the plurality of instructions further cause the computing device to:
determine whether processor core error was caused by an unallocated processor core;
replace the unallocated processor core that caused the processor core error with a replacement processor core from the spare set of processor cores in response to a determination that the processor core error was caused by the unallocated processor core.

17. The one or more non-transitory machine readable media of claim 16, wherein to replace the unallocated processor core comprises to replace the unallocated processor with the replacement processor core without interrupting the execution of the operating system.

18. The one or more non-transitory machine readable media of claim 16, wherein to replace the unallocated processor core comprises to set a virtual core identification number associated with the replacement processor core to a virtual core identification number associated with the unallocated processor core that caused the processor core error.

19. The one or more non-transitory machine readable media of claim 18, wherein to allocate at least one processor core comprises to:
establish a register flag for each processor core of the plurality of processor cores usable to denote whether the associated processor core has failed, and
establish an interrupt register flag for each processor core of the plurality of processor cores useable to cause any hardware interrupt originating from the associated processor core to be broadcast only to other processor cores of the spare set of processor cores and not to any unallocated processor core.

20. The one or more non-transitory machine readable media of claim 16, wherein to replace the unallocated processor core comprises to update a processor core register to indicate that the unallocated processor core has failed and that the replacement processor core is no longer allocated to the spare set of processor cores.

21. The one or more non-transitory machine readable media of claim 16, wherein to replace the unallocated processor core comprises to:
update a main hardware description table in which each of the unallocated processor cores is listed to (i) remove the unallocated processor core that caused the processor core error and (ii) add the replacement processor core, and update a spare hardware description table in which each of the processor cores of the spare set of processor cores is listed to remove the replacement processor.

22. A method comprising:

allocating at least one processor core of a plurality of processor cores of a computing device to a spare set of processor cores;

executing an operating system on the computing device using only the unallocated processor cores of the plurality of processor cores;

executing a software application on the computing device using the spare set of processor cores;

detecting a processor core error caused by a processor core of the plurality of processor cores;

determining whether a processor core error was caused by an allocated processor core;

instructing the software application to restart in response to a determination that the processor core error was caused by the allocated processor core; and assigning a new processor core of the spare set of processor cores to the software application in response to the software application being restarted.

23. The method of claim 22, further comprising:

establishing a main processor core description table for the unallocated cores and establishing a spare processor core description table for the spare set of processor cores, the main processor core description table including only the unallocated cores, executing the operating system comprises exposing the operating system only to the processor cores listed in the main processor core description table, and wherein executing the software application comprises establishing a message passing interface between the software application and at least one of the processor cores listed in the spare processor core description table.

* * * * *